US008501595B2

(12) United States Patent
Jang et al.

(10) Patent No.: US 8,501,595 B2
(45) Date of Patent: Aug. 6, 2013

(54) THIN FILM CONTAINING NANOCRYSTAL PARTICLES AND METHOD FOR PREPARING THE SAME

(75) Inventors: Eun Joo Jang, Suwon-si (KR); Hyun Dam Jeong, Suwon-si (KR); Shin Ae Jun, Seongnam-si (KR); Jong Baek Seon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 561 days.

(21) Appl. No.: 11/567,552

(22) Filed: Dec. 6, 2006

(65) Prior Publication Data
US 2007/0298160 A1 Dec. 27, 2007

(30) Foreign Application Priority Data

Jun. 22, 2006 (KR) .................. 10-2006-0056365

(51) Int. Cl.
*C23C 16/24* (2006.01)
*H01L 21/20* (2006.01)

(52) U.S. Cl.
USPC ............ 438/488; 438/584; 257/E21.411; 257/E21.372; 257/E29.276; 977/700; 977/701; 977/773

(58) Field of Classification Search
USPC ......... 438/488; 423/266, 324, 328.2, 594.18; 428/826; 977/700, 701, 773
See application file for complete search history.

(56) References Cited

U.S. PATENT DOCUMENTS

| | | | |
|---|---|---|---|
| 5,744,198 A * | 4/1998 | Hampden-Smith et al. ........ | 427/376.6 |
| 6,815,064 B2 * | 11/2004 | Treadway et al. ........ | 428/403 |
| 6,960,327 B2 * | 11/2005 | Navrotsky et al. ........ | 423/130 |
| 7,259,101 B2 * | 8/2007 | Zurcher et al. ........ | 438/700 |
| 7,404,990 B2 * | 7/2008 | Lukas et al. ........ | 427/553 |
| 2003/0129311 A1 * | 7/2003 | Huang ........ | 427/337 |
| 2003/0172867 A1 * | 9/2003 | Shinnar et al. ........ | 117/68 |
| 2006/0110313 A1 * | 5/2006 | Cho et al. ........ | 423/561.1 |
| 2007/0166645 A1 * | 7/2007 | Jeong et al. ........ | 430/270.13 |

OTHER PUBLICATIONS

Unprecedented strong blue fluorescent cadmium (II) coordination polymer based on neural and deprotonated 3-hydroxypyridine ligands Shan Gao, Zhen-Zhong Lu, Li-Hua Huo, Hui Zhao, Jing-Gui Zhao.*
Shan Gao *, Zhen-Zhong Lu, Li-Hua Huo, Hui Zhao, Jing-Gui Zha Unprecedented strong blue fluorescent cadmium(II) coordination polymer based on neutral and deprotonated 3-hydroxypyridine ligands Jan. 2005, Inorganic Chemistry Communications, Science Direct, vol. 8, Issue 1, pp. 96-98.*
Thin Solid Films 2000, vol. 359, p. 160-164.
DuPont, Thin Solid Films 2003, vol. 444, 227-234.

* cited by examiner

*Primary Examiner* — Charles Garber
*Assistant Examiner* — Abdulfattah Mustapha
(74) *Attorney, Agent, or Firm* — Cantor Colburn LLP (57) ABSTRACT

Disclosed herein is a thin film prepared using a mixture of nanocrystal particles and a molecular precursor. The nanocrystal is used in the thin film as a nucleus for crystal growth to minimize grain boundaries of the thin film and the molecular precursor is used to form the same crystal structure as the nanocrystal particles, thereby improving the crystallinity of the thin film. The thin film can be used effectively in a variety of electronic devices, including thin film transistors, electroluminescence devices, memory devices, and solar cells. Further disclosed is a method for preparing the thin film.

12 Claims, 4 Drawing Sheets

THIN FILM CONTAINING NANOCRYSTAL PARTICLES AND METHOD FOR PREPARING THE SAME

This non-provisional application claims priority to Korean Patent Application No. 2006-56365, filed on Jun. 22, 2006, and all the benefits accruing therefrom under 35 U.S.C. §119 (a), the content of which is herein incorporated by reference in its entirety.

BACKGROUND OF THE INVENTION

1. Field of the Invention

The present invention relates to a thin film containing nanocrystal particles and a method for preparing the thin film. More specifically, the present invention relates to a thin film prepared using a mixture of nanocrystal particles and a molecular precursor, in which the nanocrystal is used as a nucleus for crystal growth to minimize the grain boundaries in the thin film, and the molecular precursor is used to form the same crystal structure as the nanocrystal particles, thereby improving the crystallinity of the thin film; and a method for preparing the thin film.

2. Description of the Related Art

Flat panel displays, such as liquid crystal displays and organic electroluminescence displays, include a number of thin film transistors ("TFTs") for driving the devices. Thin film transistors comprise a gate electrode, source and drain electrodes, and a semiconductor layer activated in response to the driving of the gate electrode. A p-type or n-type semiconductor layer functions as a semiconducting channel material in which a current flowing between source and drain electrodes is modulated by applied gate voltages.

Semiconductor materials frequently used in thin film transistors include amorphous silicon ("a-Si") and polycrystalline silicon ("poly-Si"). In recent years, however, a great deal of research has been conducted on organic semiconductor materials, such as pentacene and polythiophene, for use as alternatives to the silicon based materials. The most essential requirement for the use of organic semiconductor materials in the fabrication of thin film transistors is that the charge carrier mobility of the organic semiconductor materials be sufficiently high so that good performance of the devices can be attained. Various attempts have been made to develop inorganic semiconductor materials, such as silicon-based semiconductor materials with covalent bonding, which can achieve high charge carrier mobility and can be prepared by low-cost processes, such as wet processes, and methods for preparing the semiconductor materials.

For example, thin film transistors have been proposed that comprise cadmium sulfide (CdS) film deposited by chemical bath deposition ("CBD") as a semiconductor active layer (DuPont, *Thin Solid Films* 2003, vol. 444, 227-234.). However, this deposition method suffers from problems of low deposition speed and disadvantageous applicability to processing arising from the use of a chemical bath.

Further, CdS thin films formed by electrostatic spray-assisted vapor deposition ("ESAVD") have been suggested as window layers of heterojunction thin film solar cells (*Thin Solid Films* 2000, vol. 359, p. 160-164.). According to the ESAVD technique, charged aerosol is induced toward substrates by an applied electrostatic field without the use of any high-vacuum apparatus, and hence the coating efficiency is advantageously improved. However, the ESAVD technique poses a problem in that the surface state of the thin films prepared thereby is non-uniform when compared to that of thin films prepared by spin coating.

U.S. Pat. No. 6,815,064 discloses a method for synthesizing nanocrystals composed of an inorganic metal compound, a solvent capable of coordinating to the inorganic metal compound, and a chalcogenide element. Since the size of nanocrystals that can be grown by the synthetic method disclosed therein is limited, however, the method is not suitable for practical application to semiconductor device fabrication lines.

BRIEF SUMMARY OF THE INVENTION

Therefore, the present invention has been made in view of the problems of the prior art. Thus, in an embodiment, a thin film containing nanocrystal particles is provided, in which the nanocrystal is used as a nucleus for crystal growth to reduce grain boundaries of the thin film, thereby improving the crystallinity of the thin film.

In another embodiment, a method for the preparation of a thin film containing nanocrystal particles is disclosed in which the nanocrystal is used as a nucleus for crystal growth to reduce grain boundaries of the thin film, thereby improving the crystallinity of the thin film.

In another embodiment, an electronic device comprising a thin film containing nanocrystal particles is provided in which the nanocrystal is used as a nucleus for crystal growth to reduce grain boundaries of the thin film, thereby improving the crystallinity of the thin film.

In another embodiment, there is provided a thin film prepared by mixing nanocrystal particles with a molecular precursor and growing the mixture, wherein the molecular precursor includes the same composition as the nanocrystal particles.

In another embodiment, there is provided a method for the preparation of a thin film containing nanocrystal particles, the method comprising the steps of (1) dissolving at least one nanoparticle precursor in an organic dispersant and an organic solvent, and heating the solution to a high temperature for a time sufficient to grow a crystal to prepare nanocrystal particles, (2) displacing the organic dispersant present on the surface of the nanocrystal particles with a dispersant having a high affinity for the organic solvent, (3) dissolving a molecular precursor in an organic solvent to prepare a solution of the molecular precursor, (4) mixing the nanocrystal particle solution prepared in step (2) with the molecular precursor solution prepared in step (3) to prepare a mixed solution of the nanocrystal particles and the molecular precursor, and (5) coating the mixed solution on a substrate, followed by (6) annealing to prepare a thin film.

In another embodiment, there is provided an electronic device comprising the thin film containing nanocrystal particles.

BRIEF DESCRIPTION OF THE DRAWINGS

The above and other features and advantages of the present invention will be more clearly understood from the following detailed description taken in conjunction with the accompanying drawings, in which.

DESCRIPTION OF THE INVENTION

The present invention will now be described in greater detail with reference to the accompanying drawings.

It will be understood in the following disclosure of the present invention, that as used herein, the singular forms "a", "an" and "the" are intended to include the plural forms as well, unless the context clearly indicates otherwise. It will be further understood that the terms "comprise", "comprises", and "comprising," when used in this specification, specify the presence of stated features, integers, steps, operations, elements, components, and combination of the foregoing, but do not preclude the presence and/or addition of one or more other features, integers, steps, operations, elements, components, groups, and combination of the foregoing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to a general method for preparing a crystalline thin film using a molecular precursor, a thin film is formed using a solution of the molecular precursor by a wet process, and is then annealed to remove unwanted components from a composition of the molecular precursor, and at the same time, the thin film is subjected to a suitable reaction, such as condensation, to form a solid film with a desired composition. In the course of this method, it is necessary to design the structure of the molecular precursor so that unwanted components can be removed at a temperature as low as possible and the condensation is effectively performed, and to optimize various factors, such as the kind of solvent used to form the molecular precursor solution, the concentration of the molecular precursor solution and the annealing temperature, so that a solid film with the desired composition can exist in a crystalline phase.

On the other hand, mixing of nanocrystal particles having an inherent crystal structure with a molecular precursor to form a thin film, and subsequent annealing of the thin film, avoids the need to raise the temperature to a critical point at which nuclei for crystal growth are formed from the molecular precursor, which is generally higher than the crystal growth temperature. Accordingly, it is anticipated that the crystal growth is facilitated because condensation of the molecular precursor initiates and proceeds from the surface of the nanocrystal particles at a lower temperature than the crystal growth temperature. Since the nanoparticles have higher surface energy, a crystal begins to grow at the periphery of the surface of the nanoparticles. As a result, the concentration of crystal nuclei can be controlled. It is thus anticipated that an increase in the number of grain boundaries due to simultaneous formation of an excessive number of crystal nuclei will be prevented. That is, the nanocrystal particles function as crystal nuclei, so that the critical conditions under which the crystal is grown can be milder conditions of, e.g., lower temperature and lower concentration. In addition, the concentration of the nanoparticles can be controlled to increase the size of the crystal.

Figure 1A:
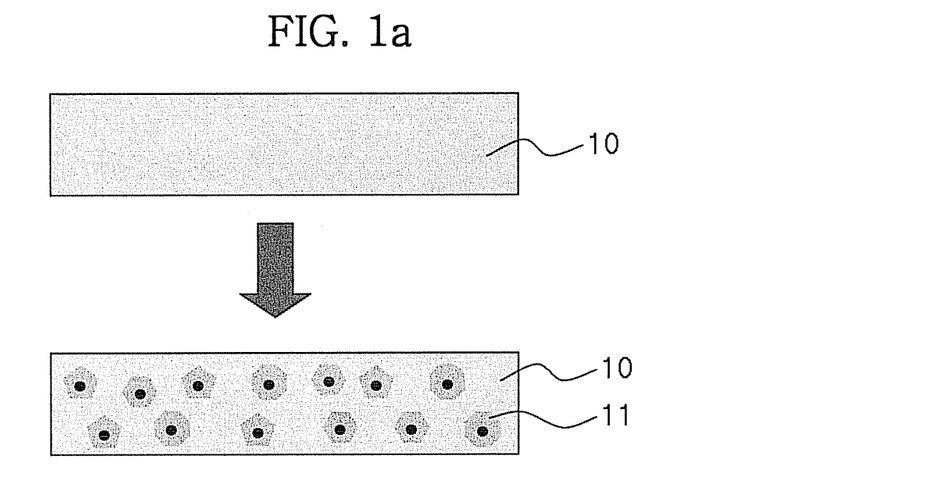
FIG. 1a shows conceptual diagrams illustrating the principle of crystal growth when an exemplary thin film is formed using a molecular precursor by a wet process, followed by annealing, in accordance with a general method.
Figure 1B:
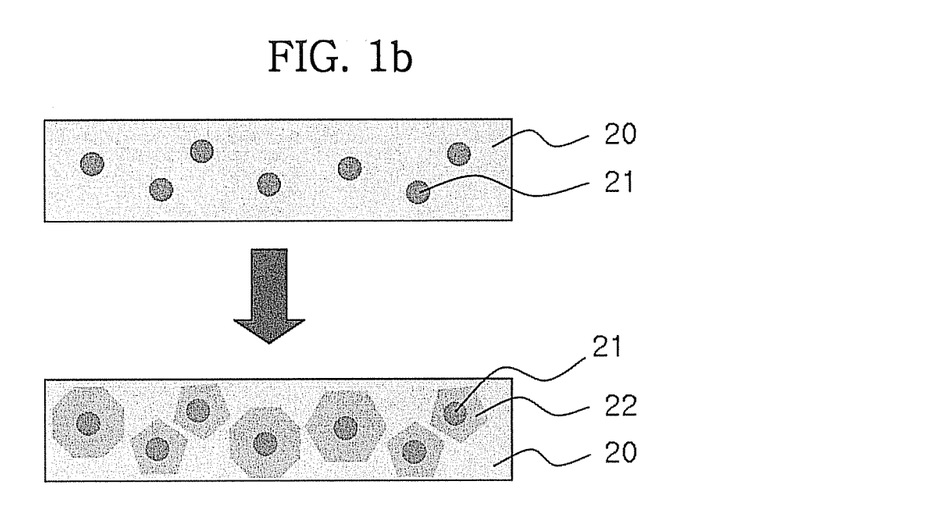
FIG. 1b shows conceptual diagrams illustrating the principle of crystal growth when an exemplary thin film is formed using nanocrystal particles and a molecular precursor, followed by annealing, in accordance with a method in an embodiment.

The crystal growth principles will be better understood from FIGS. 1a and 1b. FIG. 1a illustrates the principle of crystal growth when only a molecular precursor 10 acts as the crystal nuclei in accordance with a general method to form nanocrystals 11, and is used in the absence of nanocrystal particles; and FIG. 1b illustrates the principle of crystal growth when a molecular precursor 20 having nanocrystal particles 21 acting as crystal nuclei, both of which can be grown into the same basic crystal structure (nanocrystals 11 and 22 in FIGS. 1a and 1b, respectively), are used in accordance with the method disclosed herein. The nanocrystals 22 of FIG. 1b thus have a core-shell structure. Referring to FIGS. 1a and 1b, the size of the nanocrystal 22 shown in FIG. 1b is larger than that of the nanocrystal 11 shown in FIG. 1a.

Nanocrystal particles that are contained in the thin film can be semiconductor nanocrystal particles or metal oxide nanocrystal particles.

The semiconductor naanocrystal particles may be nanoparticles of at least one compound represented by Formula 1 below:

$$MX \quad (1)$$

wherein M is a metal atom selected from the group consisting of Group 12 elements, Group 13 elements and Group 14 elements; and X is a Group 16 chalcogenide element, but are not limited thereto.

Specifically, in Formula 1, M is selected from the group consisting of, but not limited to, cadmium (Cd), zinc (Zn), mercury (Hg), gallium (Ga), indium (In), lead (Pb) and tin (Sn), and X is selected from the group consisting of, but not limited to, sulfur (S), selenium (Se) and tellurium (Te).

In an embodiment, metal oxide nanocrystal particles contained in the thin film of the present invention are selected from the group consisting of, but not limited to, nanoparticles of zinc oxide (ZnO), zirconium oxide ($ZrO_2$), titanium oxide ($TiO_2$), magnesium oxide (Mgo), and nickel oxide ($NiO_2$).

The molecular precursor that is used to prepare the thin film containing the core-shell structured nanocrystals is comprised of the same composition as the nanocrystal particles, and is represented by Formula 2 below:

$$L_aM(X-\overset{O}{\underset{\|}{C}}-R)_b \quad (2)$$

wherein

L is a ligand having a nitrogen atom with an unshared pair of electrons.;

M is a metal atom selected from the group consisting of Group 12 elements, Group 13 elements and Group 14 elements;

X is a Group 16 chalcogenide element;

R is a hydrogen atom, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_5$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, or a substituted or unsubstituted $C_2$-$C_{30}$ heteroarylalkyl group;

a is an integer from 0 to 2; and b is 2 or 3.

Generally, since the inorganic lattices of thin films prepared from inorganic materials have extended covalent bonds between the molecules, which renders the intermolecular arrangement regular, the charge carrier mobility can be significantly increased. However, inorganic materials generally have poor solubility in organic solvents, making it impossible to prepare high-quality films by wet processes. Due to the presence of the ligand, such as for example lutidine ("Lut"), and the condensable organic reactive group linked to the Group 15 chalcogenide element in the molecular precursor, the solubility of the molecular precursor in organic solvents increases which facilitates wet processing. As a result, the problem of poor solubility of the molecular precursor can be solved.

Specifically, in Formula 2, L is selected from the group consisting of, but not limited to, 2,3-lutidine, 2,4-lutidine, 2,5-lutidine, 2,6-lutidine, 3,4-lutidine, 3,5-lutidine, 3,6-lutidine, 2,6-lutidine-$\alpha^2$,3-diol, 2-hydroxypyridine, 3-hydroxypyridine, 4-hydroxypyridine, 2-hydroxyquinoline, 6-hydroxyquinoline, 8-hydroxyquinoline, 8-hydroxy-2-quinolinecarbonitrile, 8-hydroxy-2-quinolinecarboxylic acid, 2-hydroxy-4-(trifluoromethyl)pyridine, and N,N,N,N-tetramethylethylenediamine.

Specifically, in Formula 2, M is selected from the group consisting of, but not limited to, cadmium (Cd), zinc (Zn), mercury (Hg), gallium (Ga), indium (In), lead (Pb) and tin (Sn), and X is selected from the group consisting of, but not limited to, sulfur (S), selenium (Se) and tellurium (Te).

Specific examples of molecular precursors that can be represented by Formula 2 include the compounds of Formulae 3 and 4 below:

Depending on the kind of the nanoparticles acting as crystal nuclei, the thin film of the present invention may be a semiconductor thin film or a metal oxide thin film.

In another embodiment, a method for preparing a thin film containing a core-shell structured nanocrystal is provided, the method comprising the steps of (1) dissolving at least one nanoparticle precursor in an organic dispersant and an organic solvent, and heating the solution to a high temperature e.g., greater than or equal to 150° C. for a time sufficient to grow a crystal to prepare nanocrystal particles, (2) displacing the organic dispersant present on the surface of the nanocrystal particles with a dispersant having a high affinity for the organic solvent, (3) dissolving a molecular precursor in an organic solvent to prepare a solution of the molecular precursor, (4) mixing the nanocrystal particle solution prepared in step (2) with the molecular precursor solution prepared in step (3) to prepare a mixed solution of the nanocrystal particles and the molecular precursor, and (5) coating the mixed solution on a substrate, followed by annealing to prepare a thin film.

The nanocrystal particles prepared in step (1) may be semiconductor nanocrystal particles or metal oxide nanocrystal particles.

As the semiconductor nanocrystal particles, there can be used nanoparticles of a compound represented by Formula 1 below:

wherein M is at least one metal atom selected from the group consisting of Group 12 elements, Group 13 elements and Group 14 elements, and X is at least one Group 16 chalcogenide element.

Specifically, in Formula 1, M is selected from the group consisting of, but not limited to, cadmium (Cd), zinc (Zn), mercury (Hg), gallium (Ga), indium (In), lead (Pb) and tin (Sn), and X is selected from the group consisting of, but not limited to, sulfur (S), selenium (Se) and tellurium (Te).

The molecular precursor used in the method includes the same composition as the nanocrystal particles, and is represented by Formula 2 below:

wherein

L is a ligand having a nitrogen atom with an unshared pair of electrons;

M is at least one metal atom selected from the group consisting of Group 12 elements, Group 13 elements, and Group 14 elements;

X is at least one Group 16 chalcogenide element;

R is a hydrogen atom, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_5$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, or a substituted or unsubstituted $C_2$-$C_{30}$ heteroarylalkyl group;

a is an integer from 0 to 2; and b is 2 or 3.

In Formula 2, L is selected from the group consisting of 2,3-lutidine, 2,4-lutidine, 2,5-lutidine, 2,6-lutidine, 3,4-lutidine, 3,5-lutidine, 3,6-lutidine, 2,6-lutidine-$\alpha^2$,3-diol, 2-hydroxypyridine, 3-hydroxypyridine, 4-hydroxypyridine, 2-hydroxyquinoline, 6-hydroxyquinoline, 8-hydroxyquinoline, 8-hydroxy-2-quinolinecarbonitrile, 8-hydroxy-2-quinolinecarboxylic acid, 2-hydroxy-4-(trifluoromethyl)pyridine, and N,N,N,N-tetramethylethylenediamine.

Specifically, in Formula 2, M is selected from the group consisting of, but not limited to, cadmium (Cd), zinc (Zn), mercury (Hg), gallium (Ga), indium (In), lead (Pb) and tin (Sn), and X is selected from the group consisting of, but not limited to, sulfur (S), selenium (Se) and tellurium (Te).

Specific examples of dispersants that can be used in step (1) include, but are not limited to, oleic acid, stearic acid, palmitic acid, hexyl phosphonic acid, n-octyl phosphonic acid, tetradecyl phosphonic acid, octadecyl phosphonic acid, n-octyl amine, and hexadecyl amine.

The organic solvent used in step (3) is not particularly limited. In an embodiment, organic solvent is selected from the group consisting of: aliphatic hydrocarbon solvents having six or more carbon atoms, such as hexane, heptane, and octane; aromatic hydrocarbon solvents, such as pyridine, benzene, toluene, quinoline, anisole, mesitylene, and xylene; ether-based solvents, such as tetrahydrofuran, and isopropyl ether; alcohol-based solvents having three or more carbon atoms, such as propyl alcohol, isopropyl alcohol, and butyl alcohol; amide-based solvents, such as dimethylacetamide and dimethylformamide; silicon-based solvents; and mixtures thereof.

The nanocrystal particle solution and the molecular precursor solution are preferably mixed in a ratio of 1:1 to 1:15 on a weight to weight (w/w) basis (50:50 to 1:94 on a weight percent (%) basis).

In step (5), the coating can be performed by various coating techniques, including spin coating, dip coating, roll coating, screen coating, spray coating, spin casting, flow coating, screen printing, ink-jet printing, drop casting, and the like. In an embodiment, and in view of ease of coating and thickness uniformity, spin coating is useful. Upon spin coating, the spin speed can be adjusted within the range of 100 to 10,000 rpm.

The annealing step (step (6)) includes the sub-steps of baking the coating film, curing, and crystallizing the baked film.

The baking is performed to evaporate the remaining organic solvent and dry the coating film. Due to van der Waals attraction and dipole-dipole interaction, packing occurs between the nanocrystal molecules. The baking can be performed by simply exposing the coating film to the atmosphere, subjecting the coating film to a vacuum at the initial stage of the subsequent curing, or heating the coating film to a temperature of 50° C. to 100° C. for from one second to 5 minutes under a nitrogen atmosphere.

Next, the curing and crystallization are performed to induce thermal degradation and condensation of the ligand to form a hexagonal structure of M-X. The curing and crystallization may be performed by heat-curing the mixed solution at 150-600° C. for 1 to 5 hours. Alternatively, the curing and crystallization may be performed by irradiating the mixed solution with UV light at 200 to 450 nm. The wavelength of the UV light may be varied within the range depending on the absorption wavelength of the bound ligand and the nanocrystal.

Examples of suitable substrates that can be used herein include any substrate capable of withstanding heat-curing conditions, for example, glass substrates, silicon wafers, ITO glass, quartz, silica-coated substrates, alumina-coated substrates, and plastic substrates. These substrates can be selected according to the intended applications.

In yet another embodiment, an electronic device comprising a thin film containing nanocrystal particles is provided, in which the nanocrystal is used as a nucleus for crystal growth to reduce grain boundaries of the thin film, thereby improving the crystallinity of the thin film. The thin film disclosed herein can be effectively applied to a variety of electronic devices, including thin film transistors, electroluminescence devices, memory devices and solar cells.

For example, the electronic device of the present invention may be a thin film transistor comprising a gate electrode, source and drain electrodes, and a p-type or n-type semiconductor layer activated in response to the driving of the gate electrode wherein the semiconductor layer functions as a semiconducting channel material in which a current flowing between source and drain electrodes is modulated by applied gate voltages, but is not limited to the thin film transistor structure.

Thin film transistors ("TFTs") comprising the nanocrystal-containing thin film as a semiconductor layer can be fabricated by any common TFT fabrication method using a semiconductor material.

Hereinafter, the present invention will be explained in more detail with reference to the following examples. However, these examples are given for the purpose of illustration and are not intended to limit the present invention.

EXAMPLES

Example 1

Preparation of CdS Nanoparticles

Figure 2:
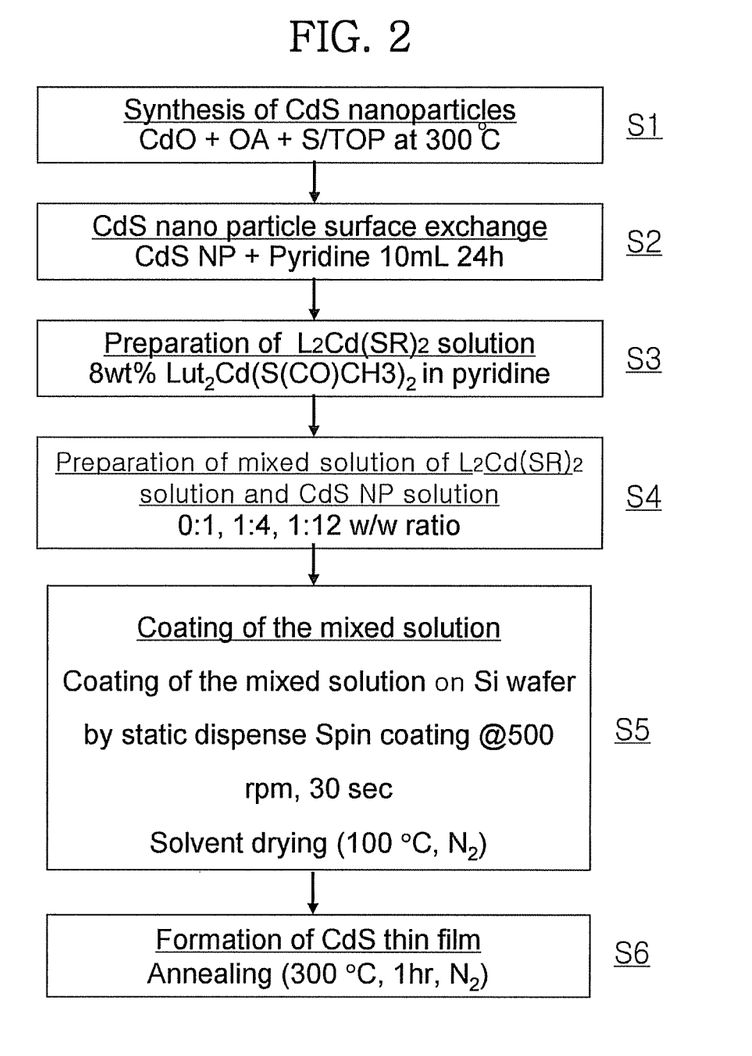
FIG. 2 is a process chart showing an exemplary method for preparing a thin film according to an embodiment.

FIG. 2 illustrates the following exemplary method for preparing a thin film. In FIG. 2, step S1, 16 g of trioctylamine, 2 g of oleic acid ("OA") and 0.4 mmol of cadmium oxide (Cdo) were simultaneously placed in a 100 ml flask equipped with a reflux condenser on a heating mantle. The reactants were stirred while maintaining constant pressure under a nitrogen atmosphere and a reaction temperature of 300° C. without any temperature gradient. The reaction temperature and stirring speed were maintained until the red cadmium oxide, turned transparent.

Separately, sulfur (S) powder was stirred in trioctylphosphine ("TOP") under a nitrogen atmosphere to obtain a transparent solution. The concentration of the sulfur precursor solution was accordingly adjusted to about 0.25 M.

2.5 ml of the sulfur precursor solution was rapidly fed to the cadmium-containing reaction system while maintaining a temperature of 300° C., and the mixture was allowed to react with stirring for 4 minutes.

After completion of the reaction, the heating mantle was removed and ethanol was added to the reaction solution to reduce the reaction temperature to room temperature as rapidly as possible, thereby quenching the reaction. Centrifugation of the cooled reaction solution from the supernatant gave a CdS precipitate. The precipitate was separated from the supernatant by decantation. The CdS nanoparticle precipitate was dispersed in toluene to provide a 1 wt % solution of the dispersed CdS nanoparticles and stored.

Figure 3:
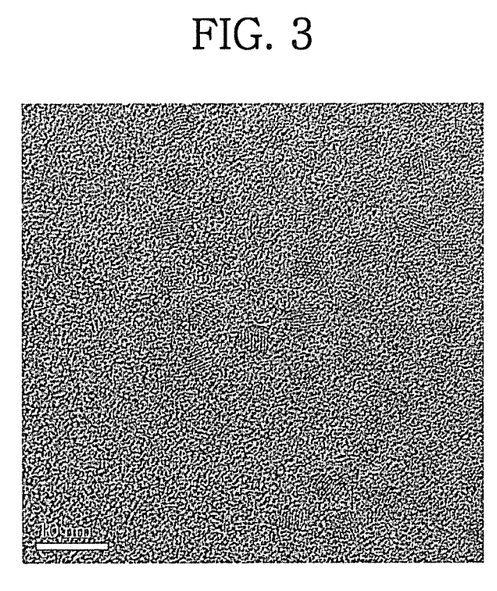
FIG. 3 is a transmission electron microscopic image of an exemplary cadmium sulfide (CdS) nanocrystal prepared in Example 1 according to an embodiment.
Figure 4:
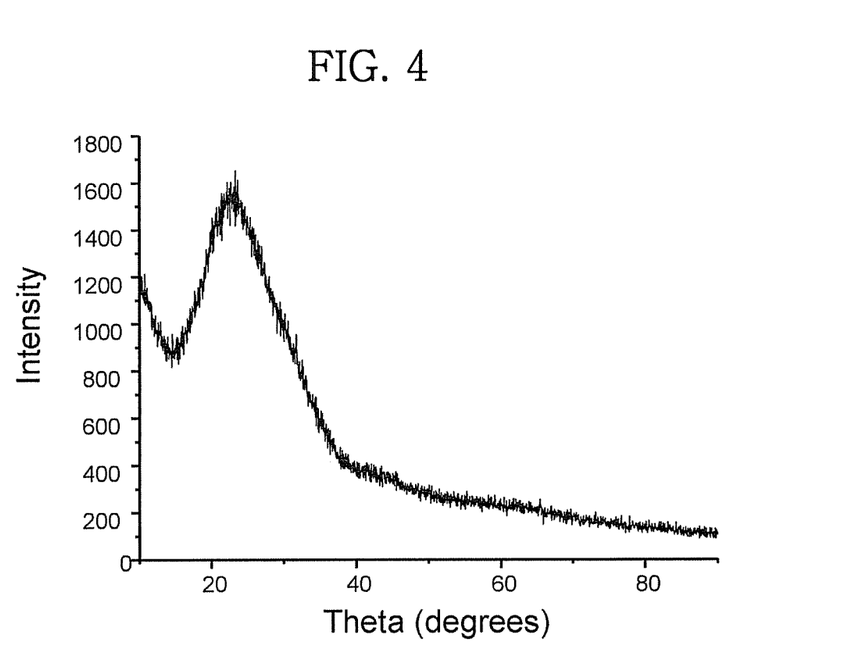
FIG. 4 is an X-ray diffraction pattern of an exemplary cadmium sulfide (CdS) nanocrystal prepared in Example 1 of the present invention.

An electron micrograph and an X-ray diffraction pattern of the crystalline cadmium sulfide (CdS) nanoparticles are shown in FIGS. 3 and 4, respectively. FIG. 3 reveals that the CdS nanoparticles have a size of about 3 nm.

Example 2

Preparation of Mixed Solution of CdS Nanoparticles and Molecular Precursor, and Preparation of Thin Film In FIG. 2, step S2, 30 mL of ethanol was added to 10 mL of the toluene dispersion of the CdS nanoparticles prepared in Example 1. The solution was centrifuged to obtain a precipitate. 10 mL of pyridine was added to the precipitate, and stirred for about 24 hours to obtain a transparent solution.

30 mL of hexane was added to the solution, followed by centrifugation. The obtained precipitate was weighed, and then pyridine was added in an amount such that the concentration of the precipitate was 2 wt %. The mixture was stirred to obtain a transparent solution.

In FIG. 2, step S3, separately, pyridine was added to a cluster of Lut$_2$Cd(S(CO)CH$_3$)$_2$ to prepare a solution having a concentration of 8 wt %.

In FIG. 2, step S4, 1.5 mL of the pyridine solution of the Lut$_2$Cd(S(CO)CH$_3$)$_2$ cluster (8 wt %) was mixed with 0.5 mL of the CdS nanoparticle solution to prepare a mixed solution of the Lut$_2$Cd(S(CO)CH$_3$)$_2$ cluster (6 wt %) and the CdS nanoparticles (0.5 wt %). In FIG. 2, step S5, the mixed solution was coated on a Si substrate, and annealed by heated to 300° C. for one hour in FIG. 2, step S6.

Figure 5:
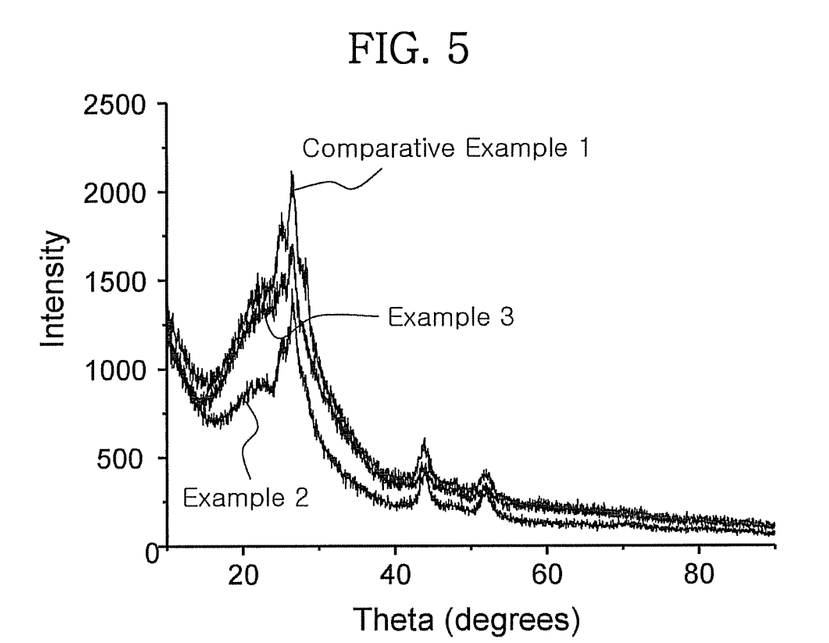
FIG. 5 shows X-ray diffraction patterns which demonstrate the crystal size of exemplary thin films prepared in Examples 2 and 3 and Comparative Example 1.

An X-ray diffraction pattern of the annealed substrate is shown in FIG. 5, which exhibits a crystal size of 71 Å.

Example 3

Preparation of Mixed Solution of CdS Nanoparticles and Molecular Precursor, and Preparation of Thin Film In FIG. 2, step S4, the procedure of Example 2 was repeated except that 1 mL of the pyridine solution of the Lut$_2$Cd(S(CO)CH$_3$)$_2$ cluster (8 wt %) was mixed with 1 mL of the CdS nanoparticle solution to prepare a mixed solution of the Lut$_2$Cd(S(CO)CH$_3$)$_2$ cluster (4 wt %) and the CdS nanoparticles (1 wt %). In FIG. 2, step S5, the mixed solution was coated on a Si substrate, and annealed by heating to 300° C. for one hour in FIG. 2, step S6. An X-ray diffraction pattern of the annealed substrate is shown in FIG. 5, which exhibits a crystal size of 62 Å.

Comparative Example 1

Preparation of Molecular Precursor Solution, and Preparation of Thin Film

The procedure of Example 2 was repeated except that 1 mL of the pyridine solution of the Lut$_2$Cd(S(CO)CH$_3$)$_2$ cluster (8 wt %) from FIG. 2, step S3 was coated on a Si substrate (FIG. 2, S5) instead of the mixed solution of the CdS nanoparticles and the molecular precursor, thereby eliminating step S4 from the sequence of steps provided in FIG. 2. The resulting substrate was annealed at 300° C. for one hour (FIG. 2, S6). An X-ray diffraction pattern of the annealed substrate is shown in FIG. 5, which exhibits a crystal size of 58 Å.

As apparent from the above description, the thin film disclosed herein is prepared from a mixture of nanocrystal particles and a molecular precursor. The nanocrystal particles are used as nuclei for crystal growth to reduce grain boundaries of the thin film. The thin film shows superior electrical properties, e.g., charge carrier mobility, and improved physical properties, e.g., crystallinity. According to the method disclosed herein, a thin film can be prepared in a large area by a wet process, e.g., spin coating and dip coating. In addition, low-temperature annealing can be preformed to prepare the thin film, thus contributing to cost reduction.

The thin film, which is prepared from a mixture of nanocrystal particles and a molecular precursor to improve its crystallinity at low temperature, can be effectively utilized in various applications, such as thin film transistors, electroluminescence devices, memory devices, and solar cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thin film, comprising:
nanocrystal particles, in
a matrix,
wherein the thin film is prepared from a mixture of the nanocrystal particles and a molecular precursor by a wet process, followed by an annealing process,
the matrix derives from the molecular precursor and has a composition identical to that of the nanocrystal particles and a crystal structure identical to that of the nanocrystal particles, and
the nanocrystal particles act as nuclei for crystal growth of the thin film, wherein the molecular precursor is a compound represented by Formula 2 below:

wherein
L is a ligand having a nitrogen atom with an unshared pair of electrons;
M is at least one metal atom selected from the group consisting of Group 12 elements, Group 13 elements and Group 14 elements;
X is at least one Group 16 chalcogenide element;
R is a hydrogen atom, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_5$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, or a substituted or unsubstituted $C_2$-$C_{30}$ heteroarylalkyl group;
a is an integer from 0 to 2; and
b is 2 or 3.

2. The thin film according to claim 1, wherein the nanocrystal particles are semiconductor nanocrystal particles or metal oxide nanocrystal particles.

3. The thin film according to claim 2, wherein the semiconductor nanocrystal particles are nanoparticles of at least one compound represented by Formula 1 below:

wherein
M is at least one metal atom selected from the group consisting of Group 12 elements, Group 13 elements and Group 14 elements, and
X is at least one Group 16 chalcogenide element.

4. The thin film according to claim 3, wherein, in Formula 1, M is selected from the group consisting of cadmium (Cd), zinc (Zn), mercury (Hg), gallium (Ga), indium (In), lead (Pb) and tin (Sn), and X is selected from the group consisting of sulfur (S), selenium (Se) and tellurium (Te).

5. The thin film according to claim 2, wherein the metal oxide is selected from the group consisting of zinc oxide (ZnO), zirconium oxide (ZrO$_2$), titanium oxide (TiO$_2$), magnesium oxide (MgO), and nickel oxide (NiO$_2$).

6. The thin film according to claim 1, wherein, in Formula 2, L is selected from the group consisting of 2,3-lutidine, 2,4-lutidine, 2,5-lutidine, 2,6-lutidine, 3,4-lutidine, 3,5-lutidine, 3,6-lutidine, 2,6-lutidine-α$^2$,3-diol, 2-hydroxypyridine, 3-hydroxypyridine, 4-hydroxypyridine, 2-hydroxyquinoline, 6-hydroxyquinoline, 8-hydroxyquinoline, 8-hydroxy-2-quinolinecarbonitrile, 8-hydroxy-2-quinolinecarboxylic acid, 2-hydroxy-4-(trifluoromethyl)pyridine, and N,N,N,N-tetramethylethylenediamine.

7. The thin film according to claim 1, wherein, in Formula 2, M is selected from the group consisting of cadmium (Cd), zinc (Zn), mercury (Hg), gallium (Ga), indium (In), lead (Pb) and tin (Sn), and X is selected from the group consisting of sulfur (S), selenium (Se) and tellurium (Te).

8. The thin film according to claim 1, wherein the molecular precursor is the compound of Formula 3 below:

(3)

9. The thin film according to claim 1, wherein the molecular precursor is the compound of Formula 4 below:

(4)

10. The thin film according to claim 1, wherein the thin film is a semiconductor thin film or a metal oxide thin film.

11. An electronic device comprising the thin film according to claim 1.

12. The electronic device according to claim 11, wherein the thin film is a thin film transistor, an electroluminescence device, a memory device, or a solar cell.

* * * * *